United States Patent

[11] 3,562,564

| [72] | Inventor | Frederick M. Potter |
| | | Little Silver, N.J. |
| [21] | Appl. No. | 875,135 |
| [22] | Filed | Nov. 10, 1969 |
| [45] | Patented | Feb. 9, 1971 |
| [73] | Assignee | The Bendix Corporation |
| | | a corporation of Delaware |

[54] BRUSHLESS OIL-COOLED GENERATOR
10 Claims, 4 Drawing Figs.

[52] U.S. Cl. .................................................. 310/54,
310/68
[51] Int. Cl. ..................................................... H02k 9/19,
H02m 7/06
[50] Field of Search ........................................... 310/54,
68.4; 321/28

[56] References Cited
UNITED STATES PATENTS

| 2,897,383 | 7/1959 | Barrows et al. ............... | 310/68 |
| 3,078,409 | 2/1963 | Bertsche et al. .............. | 321/28X |
| 3,260,872 | 7/1966 | Potter ........................... | 310/54 |

*Primary Examiner*—D. X. Sliney
*Attorneys*—Plante, Hartz, Smith & Thompson and James M. Nickels ABSTRACT: A brushless DC oil cooled generator utilizing delta windings displaced by 30 electrical degrees, feeding through a full wave rectifier system to a common bus. Also improved means are provided for cooling and mounting the rectifiers.

INVENTOR.
FREDERICK M. POTTER
BY
ATTORNEY

PATENTED FEB 9 1971 3,562,564

INVENTOR.
FREDERICK M. POTTER
BY

ATTORNEY 3,562,564

BRUSHLESS OIL-COOLED GENERATOR

BACKGROUND OF THE INVENTION

1. Field of the Invention

The invention relates to the field of dynamoelectric machines and more particularly to the field of liquid cooled generators.

2. Description of the Prior Art

In the past diode commutation of a three phase brushless DC machine has presented a problem in obtaining a suitable DC output. To shift to a twelve phase machine resulted in a loss of efficiency. Also there was the problem of providing adequate cooling for the diodes.

The present invention provides a machine that has diode commutation equivalent to a twelve phase machine but has the efficiency of a three phase machine. Also it provides improved means for cooling the diodes.

SUMMARY OF THE INVENTION

A brushless oil cooled DC generator in which two groups of windings in the stator are 30 electrical degrees apart and connected directly to the diodes. Also the diodes are mounted on a heat sink which has a coolant flowing in channels therein.

DESCRIPTION OF THE PREFERRED EMBODIMENT

Figure 1:
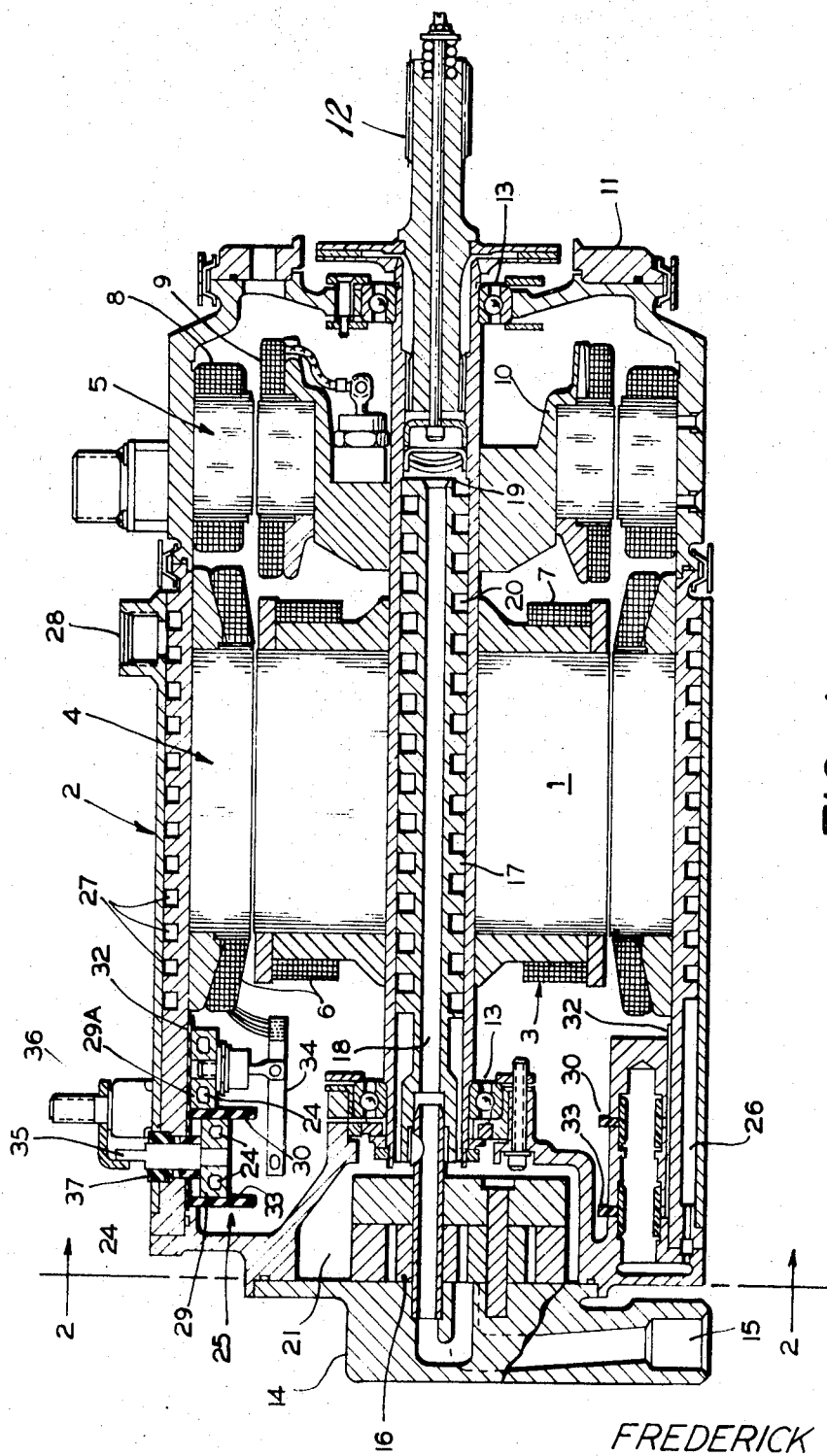
FIG. 1 is a cutaway view of a dynamoelectric machine embodying the invention.

Referring now to FIG. 1 of the drawings, a dynamoelectric machine is indicated generally by the numeral 1 and has a housing 2 in which is mounted a rotor 3. The machine 1 is illustrated as a brushless DC generator having a main generator 4 and exciter 5. The generator 4 has a stator winding 6 mounted in the housing 2 in a suitable manner and a cooperating rotor winding 7 on the rotor 3. In like manner, the exciter 5 has a stator winding 8 secured in the housing 2 and a cooperating rotor winding 9 mounted by a heat sink 10 on the rotor 3.

The housing 2 includes a mounting flange 11 adapter for attaching the generator 1 to a prime mover (not shown) to be driven by means of a splined shaft 12. The rotor 3 is mounted for rotation in the housing 2 by bearings 13. The housing 2 also has an end bell 14 which has a channel 15, which is adapted for connecting to an oil supply (not shown), such for example as an engine crank case. The channel 15 connects with the input of an oil pump 16 which is mounted in the housing 2. The oil pump 16 is driven by shaft 17 of the rotor 3.

Figure 2:
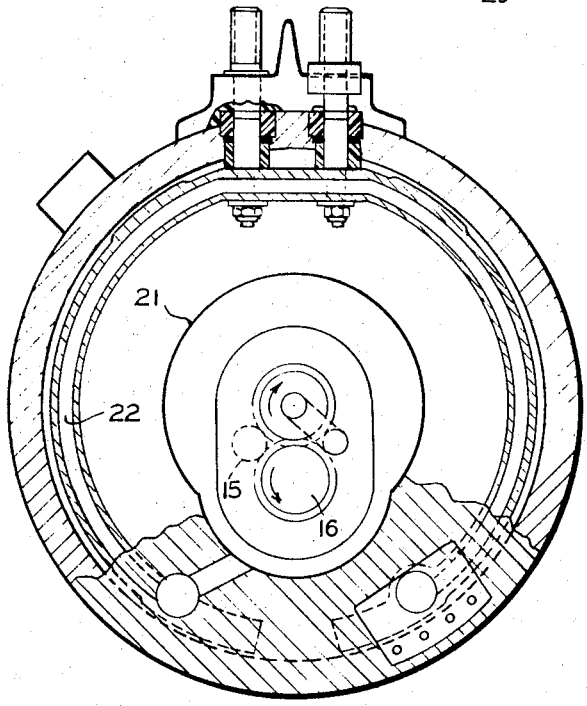
FIG. 2 is a sectional view along the lines 2–2 of FIG. 1.

The output of the pump 16 is connected to a channel 18 in the shaft 17. The channel 18 connects with a chamber 19 which in turn connects to spiral grooves 20 in the shaft 17. The spiral grooves 20 connect with a chamber 21 in the end bell 14 which connects with a channel 22 (see FIG. 2). The channel 22 connects to parallel channels 24 in rectifier assembly 25 which will be described in detail later. The channels 24 connect to channel 26 which connects to spiral grooves 27 in the housing 2. The grooves 27 connect to an outlet 28 adapted for connecting to return the oil to the source.

Figure 3:
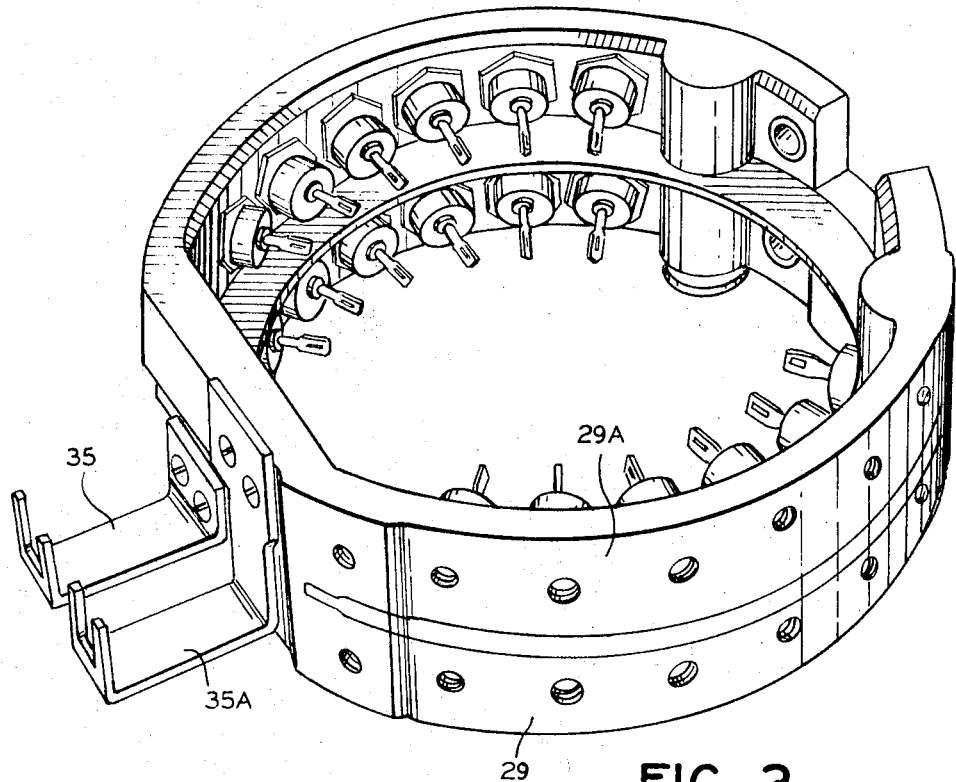
FIG. 3 is a detailed view of the diode assembly.

The rectifier assembly 25 includes a pair of circular heat sinks 29 and 29A (see FIG. 3). Each of the respective heat sinks 29 and 29A include parallel channels 24. The heat sinks 29 and 29A are mounted in the housing 2 and insulated therefrom by insulator 32. Also an insulating member 33 is positioned to insulate the heat sink 29 from the end of the housing 2. Bus bars 34 connect the respective pairs of rectifiers 31 together. The heat sinks 29 and 29A serve to connect the other side of the rectifiers 31 together and terminals 35 and 35A connect them to terminal block 36. The terminals 35 and 35A are insulated from the housing 2 by insulators 37.

Figure 4:
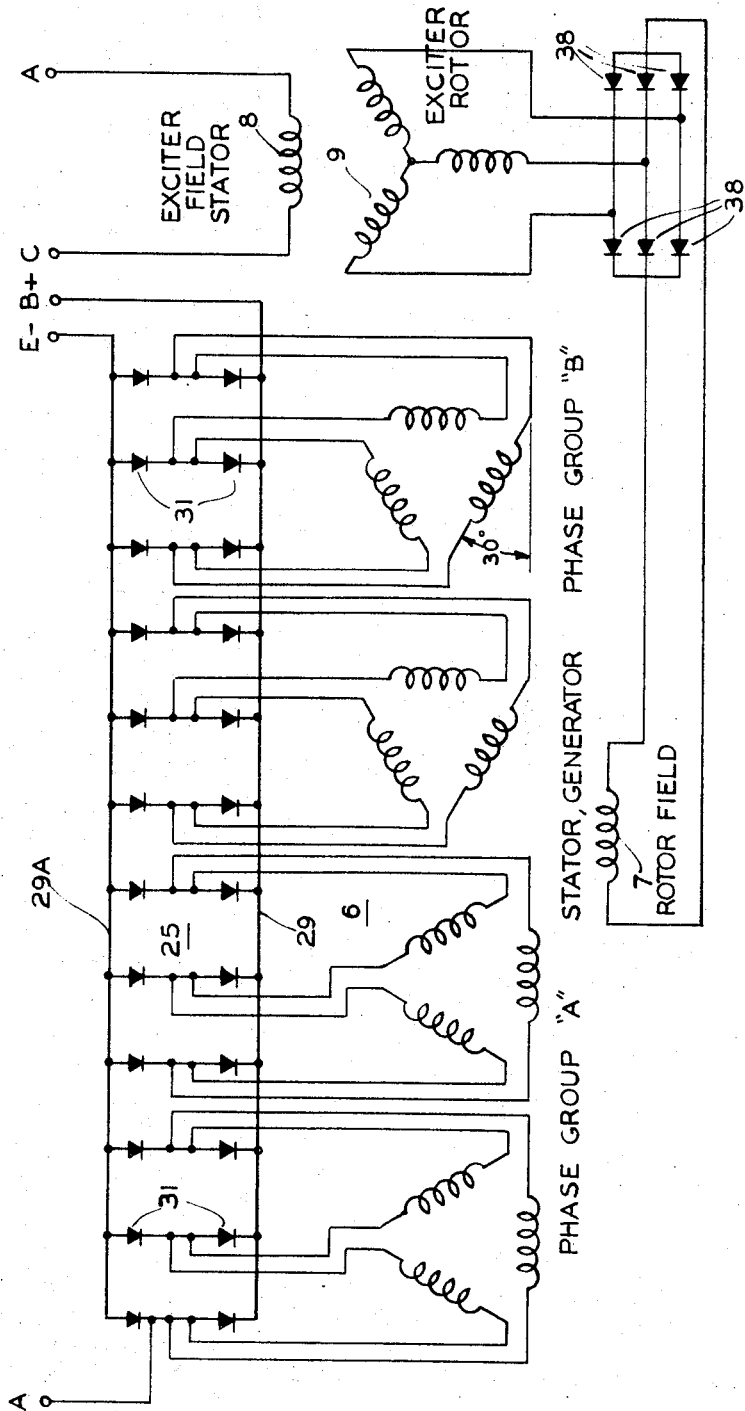
FIG. 4 is a schematic diagram of the machine of FIG. 1.

Referring now to the schematic diagram of FIG. 4, the exciter field stator 8, which may be controlled by a voltage regulator (not shown), furnishes excitation for the exciter rotor winding 9. The output of the winding 9 is rectified by diodes 38 and connected across the main generator field winding 7 which furnishes the excitation for the main generator stator winding 6. The winding 6 comprises a first pair of three phase delta windings A and a second pair of three phase delta windings B which are separated from the first pair by 30 electrical degrees. A 120 degree phase belt winding with an individual coil pitch of five-sixths or 83 percent is utilized in forming the winding 6 which has four separate delta connected groups of windings insulated from each other with each corner of each delta winding connected to the junction between a pair of positive and negative diodes. This arrangement provides an excellent AC voltage wave form, completely canceling third harmonics and prevents circulating current in the closed delta windings. The effective 12 phase diode commutation obtained by the 30 electrical degree displacement of the windings together with the excellent waveform holds the ripple in the rectified DC output to the practical minimum.

In the operation, oil is drawn into the suction side of the pump 16 and discharged through the channel 18 to the channel 19 where it flows to the drive end of the generator. The large heat sink 10, which may be of high conductivity aluminum, conducts heat from the exciter armature and rotating diodes to the oil. The oil flow direction reverses and proceeds through the spiral grooves in the shaft 17 and collects heat from the rotor. The oil is discharged from the spiral grooves 20 at the antidrive end into chamber 21 from which it enters the parallel channels 24 in the rectifier assembly 25. The rectifiers 31 are directly mounted to the heat sinks 29 and 29A which are insulated from the generator housing 2 and from each other. Each of the heat sinks 29 and 29A includes the parallel channels 24. Thus the heat from the rectifiers is conducted directly through the heat sinks to the oil without any insulation whatsoever in the heat path flow. From the parallel channels 29 and 29A, the oil discharges into the spiral grooves 27 in the housing 2 collecting the main stator heat as it proceeds to the end of the stator to discharge port 28 for return to the oil supply.

The use of two three phase windings in one group and two three phase windings in a second group displaced by 30 electrical degrees from the first group provides diode commutation equivalent to that of a twelve phase machine yet obtains the efficiency of a three phase machine. The connections are such that they provide equidistant paths to the respective diodes. There are twelve diodes on the positive heat sink and twelve diodes on the negative heat sink. By connecting each corner of the delta windings between the respective pairs of positive and negative diodes, excellent paralleling and sharing of the current between the diodes is obtained.

Although only one embodiment of the invention has been illustrated and described, various changes in the form and relative arrangement of the parts, which will now appear to those skilled in the art, may be made without departing from the scope of the invention.

I claim:

1. A brushless DC generator comprising a housing, a rotor mounted for rotation in said housing, a main generator stator winding mounted in said housing, a cooperating main generator rotor winding mounted on said rotor, an exciter stator winding mounted in said housing, an exciter rotor winding mounted on said rotor, means including diodes connecting the output from said exciter rotor winding to said main generator rotor winding, a pair of heat sinks mounted in and insulated from said housing, a plurality of rectifiers mounted on said heat sinks, means connecting the output from said main generator stator windings to said rectifiers, channels in said rotor, in said heat sinks and in said housing, and means connecting said channels in said rotor to the channels is said heat sinks and connecting the channels in said heat sinks to the channels in said housing to circulate a cooling fluid therein to conduct heat from all of said windings and said rectifiers.

2. The combination as set forth in claim 1 in which said main generator stator winding comprises two groups of three phase delta windings spaced 30 electrical degrees apart.

3. The combination as set forth in claim 2 in which each end of said delta windings are connected directly to respective pairs of rectifiers.

4. The combination as set forth in claim 3 in which there are twelve positive rectifiers and twelve negative rectifiers.

5. The combination as set forth in claim 2 in which each group of delta windings include two windings in each group.

6. The combination as set forth in claim 1 in which said heat sinks are circularly and each heat sink includes a pair of a parallel channels extending substantially around the circumference thereof.

7. The combination as set forth in claim 1 and including a pump connected for circulating said cooling fluid.

8. The combination as set forth in claim 1 in which said heat sinks are insulated from each other.

9. The combination as set forth in claim 1 and including bus bars connecting the respective pairs of rectifiers together.

10. The combination as set forth in claim 1 in which the channels in said housing and rotor are spiral grooves.